Nov. 23, 1926.

W. C. FERGUSON

PIPE JOINTING ELEMENT

Filed June 13, 1924

1,608,470

INVENTOR
William C. Ferguson.
By Bakewell + Church
ATTORNEYS

Patented Nov. 23, 1926.

1,608,470

UNITED STATES PATENT OFFICE.

WILLIAM C. FERGUSON, OF ST. LOUIS, MISSOURI.

PIPE-JOINTING ELEMENT.

Application filed June 13, 1924. Serial No. 719,795.

This invention relates to joints for sewer pipe and water pipe of the bell and spigot type.

In laying pipe of the type referred to it is the usual commercial custom to join the pipe together either by packing cement or mortar in the bell portion of each pipe after the spigot end of the adjacent pipe has been inserted in the bell, or by filling the space between the bell on one pipe and the spigot end of the adjacent pipe with oakum and asphalt that is flowed into said space when it is in a molten state. Cement joints are objectionable, in that they are inelastic and liable to break in the event the pipe settle, thus producing cracks or open joints in the line through which the liquid flowing through the line can escape and through which tree roots can penetrate into the line and clog same. Poured joints formed from hot asphalt are superior in many respects to concrete joints, but they require the services of a skilled mechanic; they are expensive to produce and they are not absolutely reliable, as the hot asphalt very often chills before it has flowed into the space which it is designed to fill, thus leaving a crack or opening in the joint that escapes detection at the time the joint is produced. Neither cement joints nor poured asphalt joints can be produced under water; they cannot be tightened in the event a leak develops without removing the material from which they are constructed, and they are not well adapted for joining pipe that are connected together on the surface of the ground and then lowered into a ditch.

One object of my invention is to provide a practical jointing element for pipe of the bell and spigot type which will produce a joint that is absolutely water-tight; that has sufficient elasticity or flexibility to prevent it from opening up or causing the bell portions of the pipe in a pipe line to break in the event the pipe line settles, and that has all of the desirable characteristics of a poured asphalt joint, but is more reliable, less expensive to produce and is capable of being produced quickly and easily by an unskilled mechanic.

Another object is to provide a jointing element for bell and spigot pipe which is of such a character that a water-tight joint can be produced under water.

Another object of my invention is to provide a practicable inexpensive jointing element for bell and spigot pipe that can be manufactured and shipped complete ready for insertion in the bell of a pipe at the point where pipe are being laid, and thus do away with the expense of making joints from materials that either have to be mixed or heated to a high degree at the place where the joints are being produced.

Another object is to provide a jointing element of the kind referred to that will produce a water-tight joint between two pipe whose bell and spigot are not true and symmetrical.

Another object is to provide a jointing element for bell and spigot pipe that can be tightened easily in the event a leak develops and without the necessity of removing said element from the bell of the pipe with which it co-operates.

Another object is to provide a jointing element for bell and spigot pipe that can be arranged in the bell of a pipe before the pipe is lowered into a ditch and which is of such design that it will automatically center the spigot end of one pipe in the bell of the adjacent pipe.

And still another object is to provide a jointing element for bell and spigot pipe which is of such design that after it has been installed portions of said element will be positioned between the abutting ends of the adjacent pipe and also between the spigot end of one pipe and the bell of the other pipe. Other objects and desirable features of my invention will be hereinafter pointed out.

To this end I have devised a pipe jointing element which consists of a gasket or deformable, water-proof member formed of asphalt or an asphaltic compound that is adapted to be arranged in the bell of one pipe and then subjected to pressure from the spigot of the other pipe in such a way as to cause said member to completely fill the annular space between said spigot and bell. The jointing element may either be of annular form or in the form of a strip that can be positioned inside of the bell with its ends abutting, and in most instances the body of said jointing element will be formed of an asphaltic compound of such consistency that the jointing element can be handled readily without losing its shape, but will be capable of deforming under all ordinary working weather. In the preferred form of my invention herein illustrated the jointing element consists of a gasket or core formed from a water-proof, plastic asphaltic compound, and an outer case or covering for said core that will permit the core to deform in such a way as to become packed tightly between the abutting ends of the pipe and between the bell and spigot during the operation of forcing the spigot into the bell. In a jointing element designed for use with sewer pipe it is preferable to encase the core in a tubular outer cover or casing formed from an inexpensive fabric, such as a porous cotton fabric, due to the fact that an outer covering formed from such material permits the plastic core to ooze through the meshes of the outer cover, and thus form an adhesive coating on the exterior of the jointing element that will adhere to the inner surface of the bell of one pipe and the outer surface of the spigot end of the adjacent pipe. I wish it to be understood, however, that it is immaterial, so far as my broad idea is concerned, what particular kind of an asphaltic substance is used to form the core and what particular kind of fabric is used to form the casing of the core, so long as the core is of such consistency that it will be capable of deforming and flowing during the deforming operation, and the outer case or covering will permit deformation of the core, but will retard the flowing of the core sufficiently to prevent the core from extruding into the barrels of the pipe and insure the core being packed tightly into the space which the jointing element is intended to fill.

Figure 1 of the drawings is a sectional view, illustrating a jointing element constructed in accordance with my invention arranged in operative position in the bell of a pipe before the spigot end of the adjacent pipe is introduced into said bell.

Figure 1:
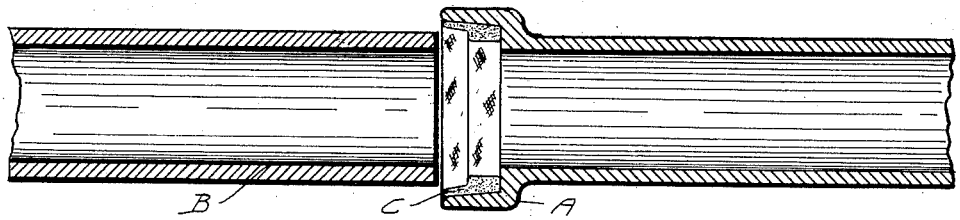

In the drawings A designates the bell of a conventional sewer pipe, and B designates the spigot of an adjacent pipe that is adapted to be inserted in said bell. Prior to the operation of inserting the spigot A in the bell B a jointing element, designated as an entirety by the reference character C, is arranged inside of the bell A, as shown in Figure 1. Said jointing element C is preferably composed of a gasket or core 1 formed of a water-proof, asphaltic composition, and an outer case or covering 2 that encases the core 1. In most instances the outer case or covering 2 of the jointing element will be formed from a cheap open-mesh fabric such as cheesecloth, due to the fact that such material permits the plastic substance from which the core 1 is formed to ooze through the fabric 2 and adhere to the inner face of the bell A of one pipe and the spigot end B of the adjacent pipe. The jointing element C may either be of annular form or in the form of a strip that can be arranged inside of the bell A with its ends abutting. The particular cross-sectional shape of said jointing element can also be varied, but when the jointing element is designed for use with conventional sewer pipe, the edge of same that is arranged adjacent the outer end of the bell will be made slightly tapered and of less thickness than the other edge portion of said jointing element that is arranged at the inner end of the bell. If the case or covering 2 of the jointing element is formed from fabric, said fabric is wrapped around the core 1 so as to form a tubular casing that surrounds the core, and the edge portions of said fabric are simply overlapped, because no harm is done if said overlapped portions separate or pull apart in the operation of deforming the jointing element, due to the fact that the overlapped portions of the fabric are located on the rear face of the jointing element C that bears against the inner surface of the bell A.

Figure 2:
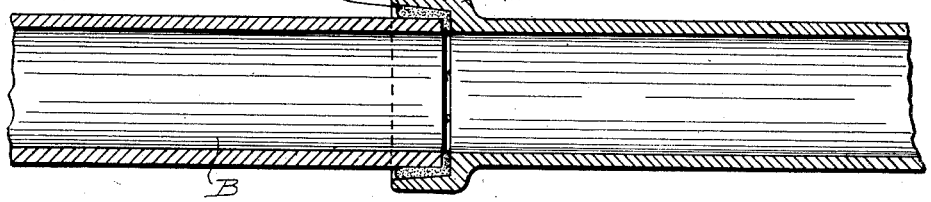
Figure 2 is a sectional view, illustrating the completed joint, showing how the spigot end of one pipe deforms the jointing element when said spigot end is forced into the bell of the adjacent pipe.
Figure 3:
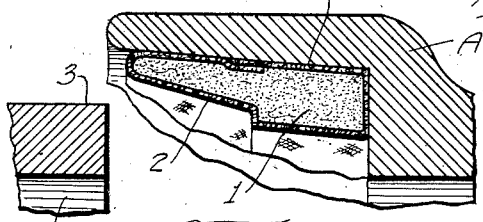
Figures 3 and 4 are enlarged fragmentary views of Figures 1 and 2, respectively.
Figure 4:
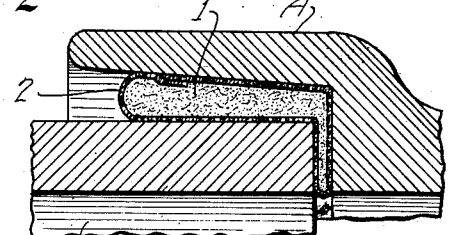

After the jointing element C has been positioned inside of the bell A of one pipe, the spigot end B of the adjacent pipe is pressed into said bell with sufficient force to seat said spigot in the bell, as shown in Figure 2, it being possible to do this with a jack or a lever device arranged in engagement with the pipe whose spigot end is being forced into the bell of the adjacent pipe. The endwise movement of the spigot B causes the jointing element C to be deformed in such a way that portions of said jointing element are packed tightly in the annular space between the outer surface of the spigot B and the inner surface of the bell A and between the end of the spigot B and the abutting end of the adjacent pipe from which the bell A projects. If it were not for the outer case or covering 2 of the jointing element, the plastic core 1 would be squeezed out between the two abutting ends of the pipe into the barrels of the pipe during the operation of forcing the spigot home. This would be an impossible condition, as the protruding material would form an obstruction and greatly diminish the capacity of the conduit formed by the pipe. The outer covering 2, however, effectually prevents this from occurring and causes the plastic core 1 of the jointing element to flow back between the outer surface of the spigot and the inner surface of the bell, due, of course, to the endwise pressure the spigot exerts on the portion of the jointing element that lies between the abutting ends of the pipe. As the plastic portion of the jointing element flows back it sets up a pressure in the case or covering 2 of the jointing element, forcing the plastic material that constitutes the core 1 into the texture of the outer casing 2, thoroughly saturating it and pressing it with great force against the walls of the surrounding pipe. This has a very desirable effect, as under this pressure all the voids are filled in the annular space between the spigot and bell and an absolutely water-tight joint is obtained. The pressure on the plastic jointing material, created by the endwise movement of the spigot into the bell, produces exactly the same conditions in the jointing element C as would be produced by caulking said jointing element, without the expenditure of time and labor involved in a caulking operation.

An important feature of the design of the jointing element C is that which determines the amount of the outer case or covering 2 which is pinched between the spigot end of one pipe and the abutting end of the adjacent pipe. The ideal design will allow the outer covering 2 of the jointing element C to come just to the inner face of the barrels of the pipe, as this effectively closes the joint between the abutting ends of the pipe and still does not form an obstruction inside of the pipe barrels. As it is intended to use this jointing element on pipe such as vitrified clay, the diameter and shape of which are very irregular, as well as on pipe having more uniform dimensions, it is necessary, in order to get a pressure on the jointing element in the annular space between the pipe, to depend on other than the wedging action between the outside of the spigot end of one pipe and the inside of the bell of the adjacent pipe, as this wedging action cannot be depended upon. This is due to the great variation in sizes and shape of individual pipe. However, the use of a plastic substance to form the core of the jointing element permits the jointing element to take such shape as is necessary in each particular joint and thus completely fill up all the inequalities and unevenness between the two pipes. Although the core is sufficiently plastic to permit it to deform to the shape of the space, it is intended to fill, it will, of course, be understood that the core is stiff enough or of such consistency that the jointing element will retain its shape in shipment, in storage, or when it is being handled in the operation of using same.

Another feature of the design which tends to make the joint absolutely watertight is that which is produced by the corner 3 of the spigot B engaging the inner side of the cover 2 of the jointing element and pulling that side of said cover in with it as it is forced into the bell A. This reduces the area within the case or covering 2 of the jointing element and helps to set up pressure that forces the plastic core 1 of the jointing element through the outer covering 2 and into the pores of the pipe.

In view of the fact that the core 1 of the jointing element C is made of a plastic or semi-plastic substance, it is preferable to make the jointing element C in the form of strips which are of such cross-sectional shape that when two of said strips are placed face to face the thin tapered edge portion of one strip will be disposed oppositely to the thick edge portion of the other strip, thereby causing the strips to mutually support each other and permitting them to be packed solidly in a rectangular container.

Figure 5:
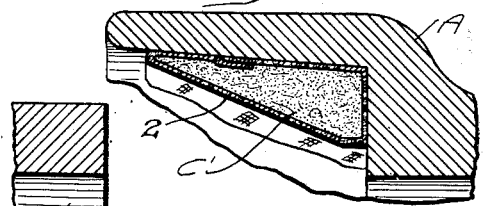
Figure 5 is a sectional view, illustrating a jointing element of slightly different form from that shown in Figure 1, showing said jointing element positioned in the bell of one pipe before the spigot end of the adjacent pipe is forced into said bell.
Figure 6:
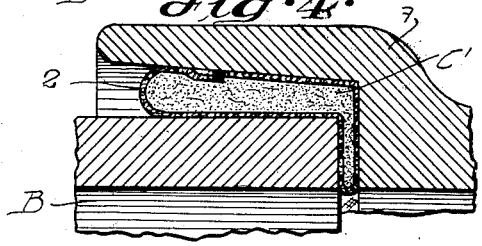
Figure 6 is a view, illustrating how the jointing element shown in Figure 5 is deformed by the operation of forcing the spigot into the bell.

The jointing element C′, shown in Figure 5, has all of the desirable characteristics of the jointing element C shown in Figures 1 to 4, but it is of slightly different shape in cross-section and tapers gradually from its inner towards its outer edge. In the operation of forcing the spigot home the pressure to which the jointing element is subjected causes the core of same to be deformed into the cross-sectional shape shown in Figure 6, the overlapped portions of the outer casing 2 of the jointing element moving relatively to each other sufficiently to provide for the flow or displacement of the plastic or substantially plastic material from which the core is formed, as indicated in Figure 6.

Having thus described my invention, what I claim as new and desire to secure by Letters Patent is:

1. A jointing element for bell and spigot pipe that is adapted to be arranged inside of the bell on the end of one pipe and deformed by the pressure exerted on same by the abutting ends of the two opposed pipes as the spigot enters the bell, said element having a core formed of a substantially plastic asphaltic composition, and a fabric outer covering that encases said core.

2. A jointing element for bell and spigot pipe provided with a core, substantially wedge-shaped in cross section, which is formed of an asphaltic substance of such consistency that it will retain its shape until it is subjected to pressure in the operation of forcing the spigot into the bell and thereafter will deform and fill the space between the spigot and the bell without breaking the bell.

3. A jointing element for bell and spigot pipe provided with a core which is formed from an asphaltic substance of such consistency that it will retain its shape until it is subjected to pressure in the operation of forcing the spigot into the bell and thereafter will deform and fill the space between the spigot and the bell, and a fabric casing surrounding said core.

4. A jointing element for bell and spigot pipe provided with a core of substantially triangular shape in cross section constructed of an asphaltic compound that is plastic enough to deform and thus fill the space between the spigot and the bell when the core is subjected to pressure during the operation of forcing the spigot into the bell, and a strip of fabric surrounding said core and having its edge portions positioned on the face of the jointing element which contacts with the inner surface of the bell.

5. A pipe jointing element consisting of a strip-like asphaltic member of substantially wedge shape in cross section that is adapted to be bent into ring form and arranged in the bell of a pipe in such a position that the co-operating pipe spigot which is forced into said bell will cause said member to be packed tightly in the space between the abutting ends of said pipe and in the annular space between the spigot and the bell.

6. A pipe jointing element consisting of a strip-like member of substantially wedge shape in cross section that is adapted to be bent into ring form and arranged in the bell of a pipe with its thin edge positioned adjacent the mouth of the bell, said member having a core formed of a substantially plastic asphaltic composition, and a fabric casing or covering for said core.

WILLIAM C. FERGUSON.